(12) United States Patent
McClain (10) Patent No.: US 11,240,990 B2
(45) Date of Patent: Feb. 8, 2022

(54) METHOD AND APPARATUS TO HANDLE ANIMAL WASTE

(71) Applicant: Nancy McClain, Medina, OH (US)

(72) Inventor: Nancy McClain, Medina, OH (US)

( * ) Notice: Subject to any disclaimer, the term of this patent is extended or adjusted under 35 U.S.C. 154(b) by 447 days.

(21) Appl. No.: 16/413,675

(22) Filed: May 16, 2019

(65) Prior Publication Data
US 2020/0359593 A1 Nov. 19, 2020

(51) Int. Cl.
*A01K 1/01* (2006.01)

(52) U.S. Cl.
CPC ............ *A01K 1/0114* (2013.01); *A01K 1/011* (2013.01)

(58) Field of Classification Search
CPC .... A01K 1/0114; A01K 1/0107; A01K 1/011; A01K 1/01; A01K 1/0125
See application file for complete search history.

(56) References Cited

U.S. PATENT DOCUMENTS

| | | | | |
|---|---|---|---|---|
| 3,233,588 | A * | 2/1966 | Thomas | A01K 1/0114 119/166 |
| 5,042,430 | A * | 8/1991 | Casmira | A01K 1/0107 119/165 |
| 5,410,987 | A * | 5/1995 | Simmons | A01K 1/0114 119/165 |
| 5,471,950 | A * | 12/1995 | White | A01K 1/0107 119/165 |
| 5,515,812 | A * | 5/1996 | Faust | A01K 1/0114 119/166 |
| 5,517,947 | A * | 5/1996 | Christman | A01K 1/0114 119/165 |
| 5,615,639 | A * | 4/1997 | Knight | A01K 1/0125 119/168 |
| 5,816,195 | A * | 10/1998 | Flynn | A01K 1/0107 119/165 |
| 5,893,336 | A * | 4/1999 | Vice | A01K 1/0114 119/166 |
| 6,059,247 | A * | 5/2000 | Olivadoti | A01K 1/0107 248/346.04 |
| D435,149 | S * | 12/2000 | Kleinberg | D30/119 |
| 6,332,429 | B1 * | 12/2001 | Gramlich | A01K 1/0107 119/165 |
| 6,745,719 | B1 * | 6/2004 | Howerton | A01K 1/0114 119/166 |
| 7,621,233 | B2 * | 11/2009 | Dukes | A01K 1/0114 119/165 |
| D723,324 | S * | 3/2015 | Feriola | D7/359 |
| 9,550,214 | B2 * | 1/2017 | Harpel | B65B 39/06 |
| 9,737,045 | B1 * | 8/2017 | Scanlan | A01K 1/0107 |
| 9,936,671 | B2 * | 4/2018 | Kong | G09B 19/0076 |
| 10,375,923 | B2 * | 8/2019 | Remick | A01K 1/0114 |

(Continued)

*Primary Examiner* — Yvonne R Abbott-Lewis
(74) *Attorney, Agent, or Firm* — Emerson, Thomson & Bennett, LLC; Roger D. Emerson (57) ABSTRACT

The present invention relates to an animal waste collection and disposal apparatus that separates solid and liquid waste. The collection and disposal apparatus has a basin and a corresponding grate. The grate is placed on top of the basin and allows for any liquid waste to pass through, while retaining any solid waste on the upper surface. An absorption pad may be placed in between the basin and grate. The basin may have securement means located about at least one of its exterior edges, allowing multiple basins to be connected to one another so as to create a single, larger unit for use with larger animals.

20 Claims, 10 Drawing Sheets

(56) References Cited

U.S. PATENT DOCUMENTS

| | | | |
|---|---|---|---|
| 10,588,291 B2* | 3/2020 | Kuiper | A01K 1/0114 |
| 10,624,309 B2* | 4/2020 | Remick | A01K 1/0114 |
| 2005/0172908 A1* | 8/2005 | Belgiorno | A01K 1/0107 |
| | | | 119/166 |
| 2005/0224005 A1* | 10/2005 | Kim | A01K 1/011 |
| | | | 119/163 |
| 2018/0192610 A1* | 7/2018 | Petty | A01K 1/0114 |

* cited by examiner

METHOD AND APPARATUS TO HANDLE ANIMAL WASTE

TECHNICAL FIELD

The present invention relates generally to methods and apparatuses for the collection of waste, and more specifically the collection, storage, and disposal of organic waste, such as animal feces and urine. More particularly, the invention is a modular animal waste collection device comprising a grate that can be placed in and out of a portable basin. Specifically, the invention is a portable animal waste collection device capable of being combined with multiple like devices in order to provide a user with a collection device suitable for any different number of uses.

BACKGROUND

Animal groomers, animal shelters, boarding kennels, farms, and home owners often own animals, such as dogs. These facilities wish to provide a clean and secure environment for the animals they tend to. Animals may spend hours in these without an opportunity to go outside to relieve itself. Naturally, this sometimes results in an animal relieving itself in an unintended or undesired area, such as on the floor of its housing area.

Housing areas with solid floors can create an unsanitary environment for animals being housed. However, flooring may be porous and have cracks, allowing liquid to puddle in pockets. This can expose animals to disease if not properly cleaned.

There is a need for an easy to clean and modular basin-grate flooring system that can be combined for use in large or small-scale holding areas. The present invention satisfies these and other needs.

SUMMARY

The present invention relates to an animal waste collection and removal device. The device is comprised of two components: a basin and a grate. The basin is adapted to collect the liquid waste of an animal, and it has a length and width. The preferred length may be determined by those having skill in the art, and may be approximately between 18×18 inches to 24×24 inches, or approximately the size of commonly used absorption or animal waste pads (otherwise known as "puppy pads" or "doggie pads"), and having a depth of approximately 2 inches. The basin may have a hollow lip under the edges, allowing a user to grip when holding the basin. The grate is inserted into the basin through the top of the basin. The grate can collect solid waste, and keep the solid waste separate from the liquid waste in the basin. The grate may have four supports connected along the perimeter that lift it off the base of the basin. The grate has a lattice pattern of longitudinal and latitudinal running bars. These bars are of a thickness and distance from one another to provide support for an animal to walk on the grate, while keeping the solid waste separated from the liquid waste in the basin.

Another embodiment includes the same design for the grate, but the basin includes extruded and receiving components to connect multiple basins in series. The basin has at least four sides. According to one configuration, the basin has a slide component and a slide receiving component on sides one and three, and the basin has a plug component and a plug receiving component on sides two and four. The basins are connected by the slide component of one basin being inserted into the slide receiver of another. The plug component can connect to the plug receiver of another basin, if the basin is surrounded on at least three sides. The slides and the plugs allow for easy construction of multiple basin-grate assemblies without the need for fasteners. This allows for a user to quickly remove a basin-grate assembly from its spot in a flooring system to replace and clean the removed basin.

The basin-grate assembly may be used as a single unit or in series with multiple other assemblies to form a flooring system. A user's needs would require the use of one or two basins depending on the size of animals they are working with, while an animal shelter with large cages for multiple dogs could use as many as necessary to make the floor of the cage completely covered in the basin-grate flooring system.

The basin-grate assembly, or waste collection apparatus, is comprised of a basin and a grate. The basin has a base and four sidewalls extending upward and away from the base so as to create an enclosure around the base. Each of the sidewalls has a lip extending outward and away from the enclosure around the base. Located on the surface of at least one of the lips is at least one receiving slot. Located on the surface of at least another lip is at least one pin. The grate has four edges with internally spaced apart bars extending in both the longitudinal and latitudinal direction. The grate is placed above the enclosure around the base and supported by the sidewalls.

Another embodiment of the waste collection apparatus may be comprised of at least two basin-grate assemblies. The first basin-grate assembly is comprised of a basin having a base and four sidewalls extending upward and away from the base so as to create an enclosure around the base. Each of the sidewalls of the first basin has a lip extending outward and away from the enclosure around the base. Located on the surface of at least one of the lips is at least one receiving slot, and located on the surface of at least another lip is at least one pin. The grate of the first basin assembly has four edges with internally spaced apart bars extending in both the longitudinal and latitudinal direction. The first grate is placed above the enclosure around the base of the first basin and supported by the sidewalls. The second basin-grate assembly is comprised of a basin having a base and four sidewalls extending upward and away from the base so as to create an enclosure around the base. Each of the sidewalls of the second basin has a lip extending outward and away from the enclosure around the base. Located on the surface of at least one of the lips is at least one receiving slot, and located on the surface of at least another lip is at least one pin. The grate of the second basin assembly has four edges with internally spaced apart bars extending in both the longitudinal and latitudinal direction. The second grate is placed above the enclosure around the base of the second basin and supported by the sidewalls. The first and second basin are affixed to one another to create a single, larger waste collection apparatus.

Also provided is a method of assembling and disassembling a waste collection apparatus. The method involves affixing a first basin-grate assembly to a second basin-grate assembly. Each of the first and second basins are comprised of a base and four sidewalls extending upward and away from the respective base so as to create an enclosure around the base. Each of the sidewalls of the first and second basin have a lip extending outward and away from the enclosure around the base. Located on the surface of at least one of the lips of each basin is at least one receiving slot, and located on the surface of at least another lip of each basin is at least one pin. The grate of each of the first and second basin-grate assemblies have four edges with internally spaced apart bars extending in both the longitudinal and latitudinal direction. At least one pin from the first basin is inserted into one of the receiving slots of the second basin to join the two basin-grate assemblies together. An absorption pad is placed in the enclosure created around the base of each of the first and second basins. The first grate is positioned above the enclosure around the base of the first basin and supported by the respective sidewalls, and the second grate is positioned above the enclosure around the base of the second basin and supported by the respective sidewalls.

BRIEF DESCRIPTION OF THE DRAWINGS

The accompanying drawings in the following description illustrate various embodiments of the present disclosure.

DETAILED DESCRIPTION

Figure 1:
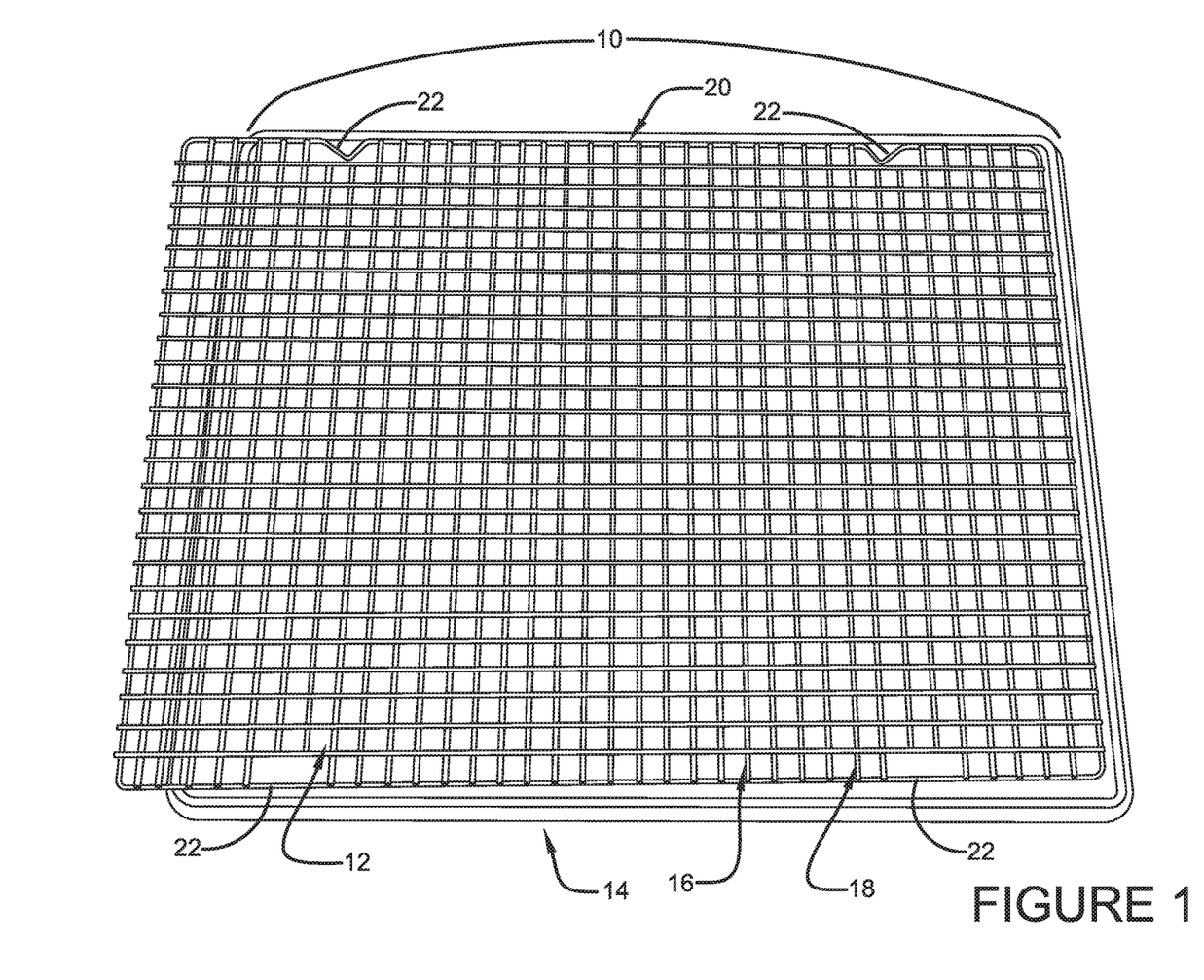
FIG. 1 is a top down view of a basin-grate assembly.

Referring now to FIG. 1, a basin-grate assembly 10 that may be used to collect and remove animal waste is shown. The basin-grate assembly 10 is comprised of a grate 12 and a basin 14. According to the embodiment shown in FIG. 1, the grate 12 is constructed of stainless-steel, while the basin 14 is constructed from a plastic material. However, additional materials of construction may be chosen by those having skill in the art, such as utilizing stainless-steal for the construction of the basin. The exact dimensions of the grate 12 and basin 14 may vary according to the size of the assembly 10 being constructed. According to one embodiment, the basin 14 has a length and width of 24 inches, such that the basin 14 is generally of a square shape, and a height of 2 inches. This size allows the grate 12 to rest atop the basin 14 in order to keep solid and liquid animal waste separated from one another. An alternative embodiment is a basin having a length and width of 18 inches, such that the basin is generally of a square shape, and having a height of 2 inches. The grate 12 separates solid waste from liquid waste by having latitudinal bars 16 and longitudinal bars 18 forming a lattice structure with gaps 20 small enough to prevent solid waste from falling into the basin 14, but large enough to allow the passage of liquid through grate 12. The grate 12 is lifted off the floor of basin 14 by supports 22. The supports 22 extend away from the plane created by the lattice structure of the latitudinal bars 16 and longitudinal bars 18, elevating the grate 12 above that of the internal base of the basin 14.

With continued reference to FIG. 1, the basin-grate assembly 10 allows for quick waste removal and cleaning to improve the sanitation of animal housing facilities. If there is solid waste, the grate 12 may be removed from the basin 14. Once removed, the animal waste may be cleared from the grate 12 and then the grate 12 may be cleaned, sanitized, or otherwise tended to. Once the grate 12 is returned to a condition suitable for use, the basin 14 can then be cleaned. First, the liquid waste must be removed from the basin 14. Once it is removed the basin 14 may be cleaned, sanitized, or otherwise tended to. After both the grate 12 and the basin 14 are returned to a condition suitable for use, the grate 12 can be returned to its original position atop basin 14.

Figure 2:
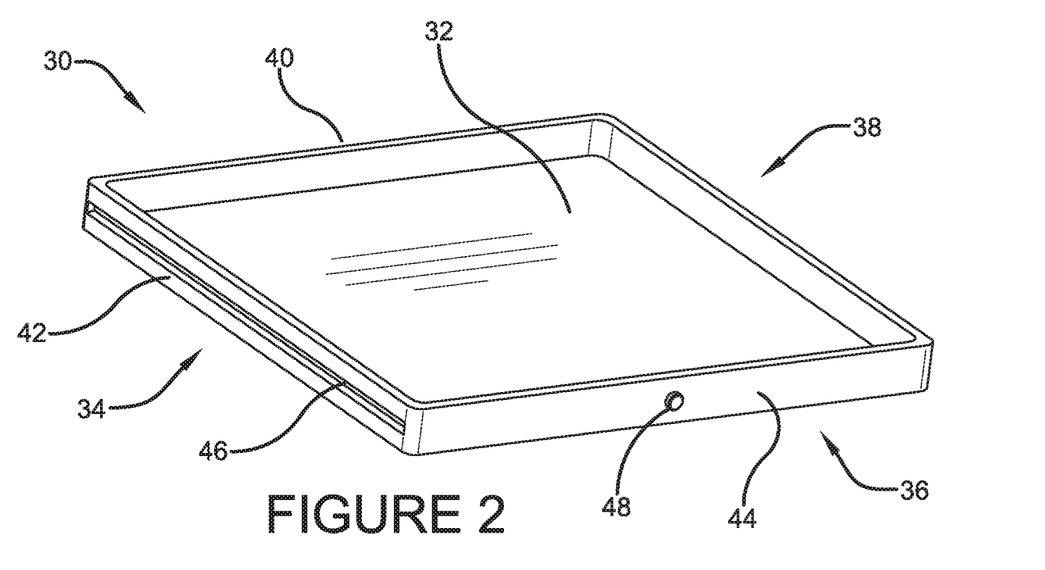
FIG. 2 is an isometric view of a receiving basin with a slide receiver and a plug component shown.

With reference now to FIG. 2, a receiving basin 30 is shown that may be used as part of a system comprising multiple basin/grate assemblies in series for constructing a larger apparatus. The receiving basin 30 is comprised of a base 32 surrounded by four outer sidewalls: first sidewall 34, second sidewall 36, third sidewall 38, and fourth sidewall 40, where the first and third sidewalls 34, 38 oppose one another and the second and fourth sidewalls 36, 40 oppose one another, such that the receiving basin 30 is of a generally rectangular construction. The receiving basin 30 may have at least a first slide receiver 46 located about the outer face 42 of the first sidewall 34. The slide receiver 46 is generally defined by an opening or cavity on the outer face 42 of the first sidewall 34 that runs from each of the conjoining edges of the first sidewall 34 with that of the second and fourth sidewalls 36, 40. The general dimensions of the slide receiver 46 may be chosen by those having skill in the art. The slide receiver 46 may have any different number of additional openings, cavities, or slots for ensuring a more secured connection between various components based upon the structure of the corresponding slide component.

According to the embodiment shown in FIG. 2, the slide receiver 46 runs about substantially the entire length of the outer face 42 of the first sidewall 34 and is positioned in approximately the center of the outer face 42 when measuring up from the base 32, which is typically positioned substantially parallel with the ground or other surface upon which the receiving basin 30 is located. According to certain embodiments, the opposing outer face of the third sidewall 38 may have a similar slide receiver (not shown in FIG. 2). The similar slide receiver may be of the same general characteristics and dimensions as that of the slide receiver 46. Each of the slide receivers are capable of receiving a corresponding slide component for joining two separate components together, such as that attached to an insertion basin 50, shown in FIG. 3 and discussed in greater detail throughout the remainder of the present disclosure.

With continued reference to FIG. 2, the outer face 44 of the second sidewall 36 may have a plug component 48. The plug component 48 may be any type of insertion or fastener means for securing two components together, such as by being received by a corresponding receiving opening on another component. According to the embodiment shown in FIG. 2, the plug component 48 is positioned in the center of the outer face 44 of the second sidewall 36. The plug component 48 is defined by extruding outward and away from the outer face 44. While the dimensions of the plug component 48 may be chosen by those having skill in the art, the embodiment of FIG. 2 illustrates a plug component 48 of a generally circular nature. The outer edges of the plug component 48 may have a grooved or otherwise textured surface that allows for a more secured connection upon insertion to a corresponding receiving opening on another component, such as a plug receiver on the corresponding insertion basin 50, shown in FIG. 3 and discussed in greater detail throughout the remainder of the present disclosure. According to certain embodiments, the opposing outer face of the fourth sidewall 40 may have a similar plug component (not shown in FIG. 2). The similar plug component may be of the same general characteristics and dimensions as that of the plug component 48.

While the embodiment of FIG. 2 is shown with at least a slide receiver 46 on the outer face 42 of the first sidewall 34 and at least a plug component on the outer face 44 of the second sidewall 36, those having skill in the art will appreciate that various other combinations of such features are possible without deviating from the scope of the present disclosure. For example, the slide receivers may be located on the second and fourth sidewalls 36, 40 and the plug components on the first and third sidewalls 34, 38. Another alternative embodiment may have a plug component located on each of the first and second sidewalls 34, 36 and slide receivers on the third and fourth sidewalls 38, 40, or alternatively plug components located on each of the third and fourth sidewalls 38, 40 and slide receivers on the first and second sidewalls 34, 36. Various other combinations may utilize only a single slide receiver, a single plug component, or any other combination of such means for joining multiple basins together.

Figure 3:
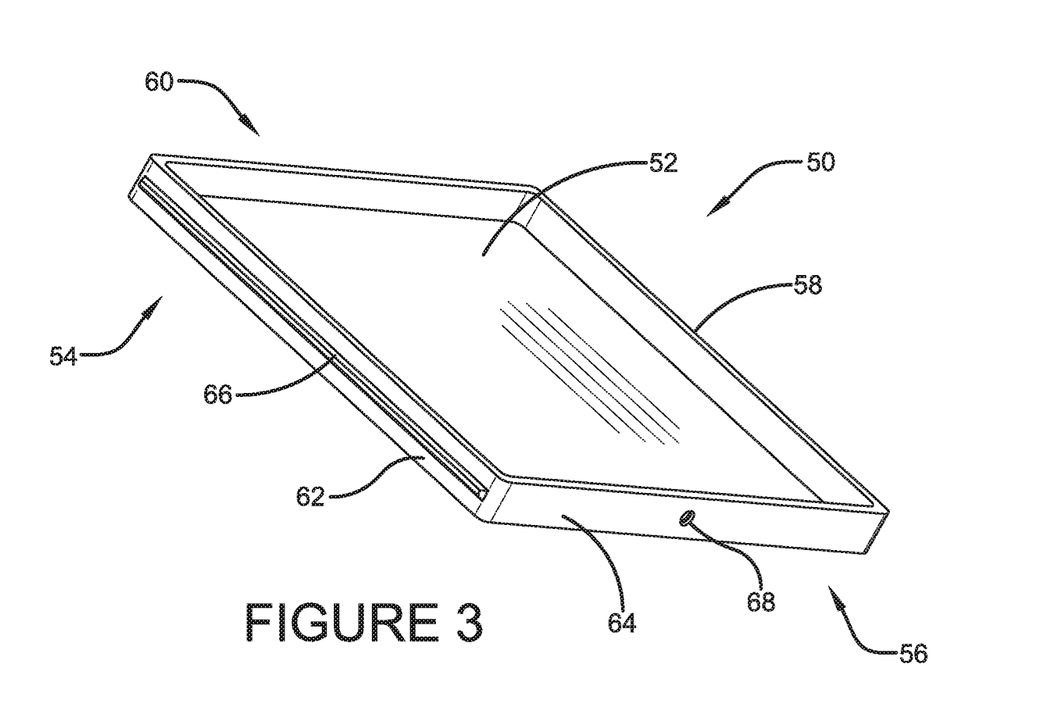
FIG. 3 is an isometric view of an insertion basin with a slide component and a plug receiver shown.

With reference now to FIG. 3, an insertion basin 50 is shown. The insertion basin 50 is comprised of a base 32 surrounded by four outer sidewalls: first sidewall 54, second sidewall 56, third sidewall 58, and fourth sidewall 60, where the first and third sidewalls 54, 58 oppose one another and the second and fourth sidewalls 56, 60 oppose one another, such that the insertion basin 50 is of a generally rectangular construction. The insertion basin 50 may have at least a first slide component 66 located about the outer face 62 of the first sidewall 54. The slide component 66 is generally defined by an extrusion or raised surface extending away from that of the outer face 62 of the first sidewall 54 that runs from each of the conjoining edges of the first sidewall 54 with that of the second and fourth sidewalls 56, 60. The general dimensions of the slide component 66 may be chosen by those having skill in the art. For example, the slide component 66 may have various types of notches, grooves, or other textures about the outer surface that are capable of being received by a corresponding feature of the slid receiver 46 on a receiving basin 30.

According to the embodiment shown in FIG. 3, the slide component 66 runs about substantially the entire length of the outer face 62 of the first sidewall 54 and is positioned in approximately the center of the outer face 52 when measuring up from the base 52, which is typically positioned substantially parallel with the ground or other surface upon which the insertion basin 50 is located. According to certain embodiments, the opposing outer face of the third sidewall 58 may have a similar slide component (not shown in FIG. 3). The similar slide component may be of the same general characteristics and dimensions as that of the slide component 66. Each of the slide components are capable of receiving a corresponding slide component for joining two separate components together, such as that attached to a receiving basin 3, shown in FIG. 2.

With continued reference to FIG. 3, the outer face 64 of the second sidewall 56 may have a plug receiver 68. The plug receiver 68 may be any type of opening or cavity capable of receiving a corresponding plug for securing two components together. According to the embodiment shown in FIG. 3, the plug receiver 68 is positioned in the center of the outer face 64 of the second sidewall 56. While the dimensions of the plug receiver 68 may be chosen by those having skill in the art, the embodiment of FIG. 3 illustrates a plug receiver having a generally circular opening capable of receiving the circular plug component 48 of the receiving basin 30, as shown in FIG. 2. The general dimensions of the plug receiver 68 may be chosen by those having skill in the art. The plug receiver 68 may have any different number of additional openings, cavities, or slots for ensuring a more secured connection between various components based upon the structure of the corresponding plug component. According to certain embodiments, the opposing outer face of the fourth sidewall 60 may have a similar plug receiver (not shown in FIG. 3). The similar plug receiver may be of the same general characteristics and dimensions as that of the plug receiver 68.

While the embodiment of FIG. 3 is shown with at least a slide component 66 on the outer face 62 of the first sidewall 54 and at least a plug receiver 68 on the outer face 64 of the second sidewall 56, those having skill in the art will appreciate that various other combinations of such features are possible without deviating from the scope of the present disclosure. For example, the slide components may be located on the second and fourth sidewalls 56, 60 and the plug receivers on the first and third sidewalls 54, 58. Another alternative embodiment may have a plug receiver located on each of the first and second sidewalls 54, 56 and slide components on the third and fourth sidewalls 58, 60, or alternatively plug receivers located on each of the third and fourth sidewalls 58, 60 and slide components on the first and second sidewalls 54, 56. Various other combinations may utilize only a single slide component, a single plug receiver, or any other combination of such means for joining multiple basins together.

With reference to each of FIGS. 2 and 3, either of the receiving basin 30 or insertion basin 50 may be used as a standalone basin with a corresponding grate. According to such standalone use, either of the receiving basin 30 or insertion basin 50 becomes a variation of the traditional basin/grate assembly 12, 14 discussed in reference to FIG. 1. Alternatively, at least one receiving basin 30 and at least one insertion basin 50 may be used together in order to construct a larger apparatus. According to one embodiment of such combined use, a receiving basin 30 and insertion basin 50 are placed next to one another such that the third sidewall 38 of the receiving basin 30 is aligned with the first sidewall 54 of the insertion basin 50, allowing the slide component 66 of the insertion basin 50 to be inserted into the corresponding slide receiver of the receiving basin 30. Alternatively, the receiving basin 30 and insertion basin 50 may be arranged such that the first sidewall 34 of the receiving basin 30 is aligned with the third sidewall 58 of the insertion based, allowing the slide component of the insertion basin 50 to be inserted into the corresponding slide receiver 46 of the receiving basin 30.

With continued reference to FIGS. 2 and 3, an alternative embodiment of combined use utilizes a receiving basin 30 and insertion basin 50 placed next to one another such that the fourth sidewall 40 of the receiving basin 30 is aligned with the second sidewall 56 of the insertion basin 50, allowing the plug component 68 of the insertion basin 50 to be inserted into the corresponding plug receiver of the receiving basin 30. Alternatively, the receiving basin 30 and insertion basin 50 may be arranged such that the second sidewall 36 of the receiving basin 30 is aligned with the fourth sidewall 60 of the insertion basin, allowing the plug component of the insertion basin 50 to be inserted into the corresponding plug receiver 48 of the receiving basin 30.

With continued reference to FIGS. 2 and 3, a single basin unit may have each of the four means of connection: a slide component; a slide receiver; a plug component; and, a plug receiver. Each of the respective four sidewalls of such a basin unit may have one such connection means. This type of basin may be referred to as a utility basin. According to such an embodiment, the basin unit may be defined by the manner of use with regards to the corresponding basin units with which it is used. For example, a basin unit that receives a corresponding slide component of another basin may be referred to as a receiving basin, and a basin unit that provides a slide component for the corresponding slide receiver of another basin may be referred to as an insertion basin. A basin unit having this type of versatility allows for any different number of combinations of basin unit arrangements to be achieved, as will become more apparent throughout the remainder of the present disclosure.

Figure 4:
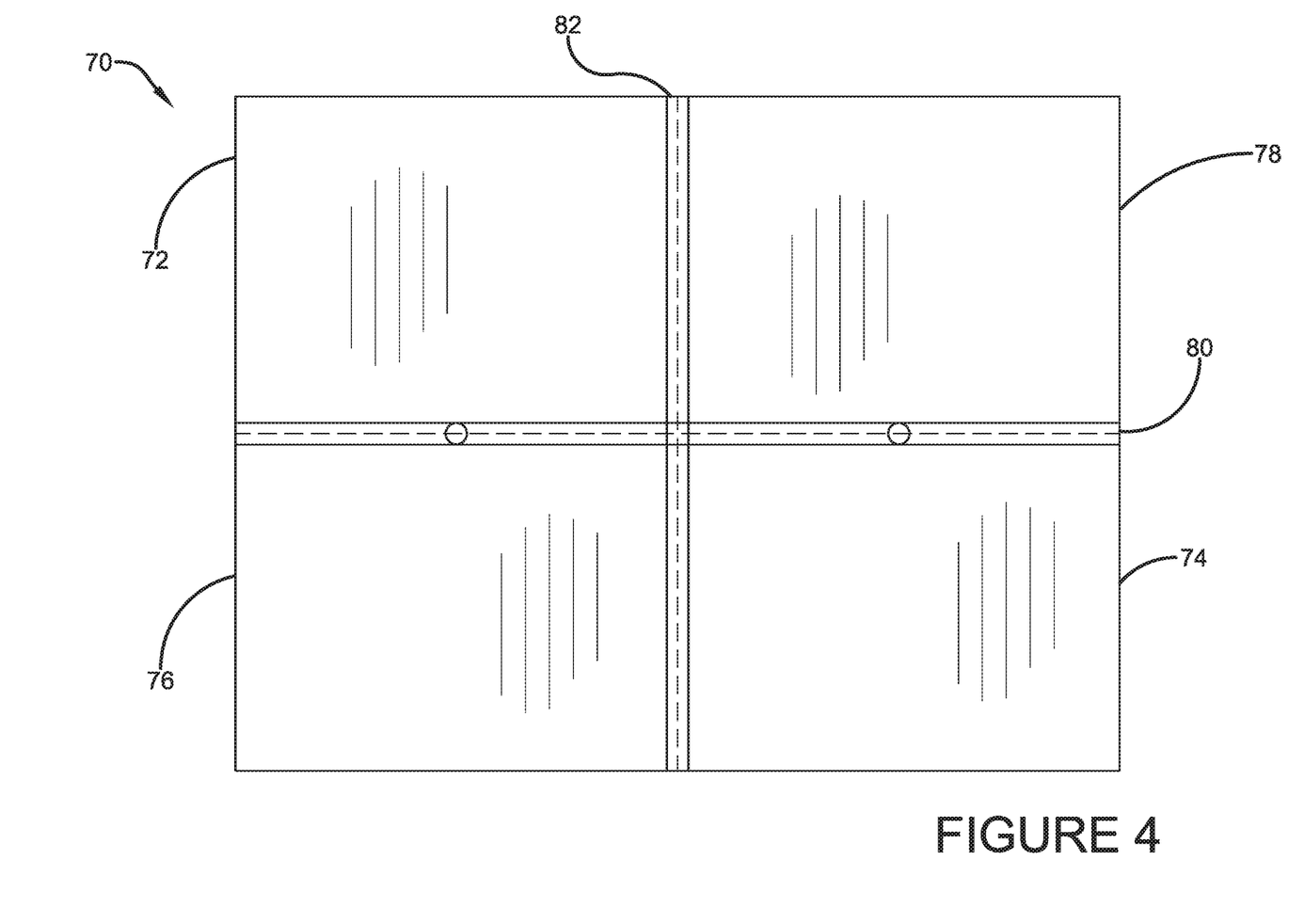
FIG. 4 shows the combination of four basin components connected to form a single, larger receiving basin unit.

With reference now to FIG. 4, a series of four separate basins are shown configured to form a single, larger apparatus, or basin assembly 70. According to the embodiment shown in FIG. 4, the basin assembly 70 is comprised of: a first receiving basin 72; a second receiving basin 74; a first insertion basin 76; and, a second insertion basin 78. The four basins 72, 74, 76, 78 are configured in a square-like arrangement to create a larger surface upon application of a corresponding grate to each respective basin. The first receiving basin 72 may be bordered along two of the sidewalls by each of the first and second insertion basins 76, 78, respectively. The first receiving basin 72 may insert its plug component into the corresponding plug receiver of the first insertion basin 76, and its slide receiver may receive the corresponding slide component of the second insertion basin 78. Similarly, the second receiving basin 74 may be bordered along two of the sidewalls by each of the first and second insertion basins 76, 78, respectively. The second receiving basin 74 may insert its plug component into the corresponding plug receiver of the second insertion basin 78, and its slide receiver may receive the corresponding slide component of the first insertion basin 76. Alternatively, the basin assembly 70 may be comprised of four utility basins, with each of the utility basins having each of the four respective means of connection, allowing for the various utility basins to be arranged according to a square-like configuration.

Multiple basin units may alternatively be arranged according to different configurations. For example, three or more basin units may be arranged in a single latitudinal plane. Such a configuration may be accomplished by flanking a single receiving basin 30 on either side by two separate insertion basins 50, such that the receiving basin 30 receives a corresponding slide component on opposing lateral sides. Additional receiving basins 30 may then be connected to either of the respective insertion basins 50 in order to continue increasing the overall length of the assembly unit. Each addition may subsequently alternate between the two different types of basin units. An alternative embodiment may arrange multiple basin units in a single longitudinal plane by flanking a single insertion basin 50 on either side by two separate receiving basins 30, such that the insertion basin 50 receives a corresponding plug component on opposing distal ends. Additional insertion basins 50 may then be connected to either of the respective receiving basins 30 in order to continue increasing the overall length of the assembly unit. Each addition may subsequently alternate between the two different types of basin units. Another alternative embodiment, for use in either a single latitudinal or single longitudinal plane of assembly, may utilize utility basin units that connect by way of the corresponding components on each subsequent basin unit. Additional embodiments may combine various features of the previously described embodiments in order to create different configurations. For example, three basins may be attached about a single latitudinal plane, with an additional basin attached about the top surface of each basin, thereby creating a rectangular basin assembly that is three basins across and two basins tall. Such configurations can be utilized according to the needs of a user or various constraints, such as available floor space.

The various basin/grate assemblies described herein may be combined with existing structures in the animal grooming and care industries. Examples of such use may include: placing a basin/grate assembly in an animals cage, crate, or other housing unit; placing a basin/grate assembly on a grooming station; configuring a large basin/grate assembly underneath a series of cages in an animal shelter or boarding facility; or, placing a basin/grate assembly under an examination table or structure at a veterinary office.

Figure 5:
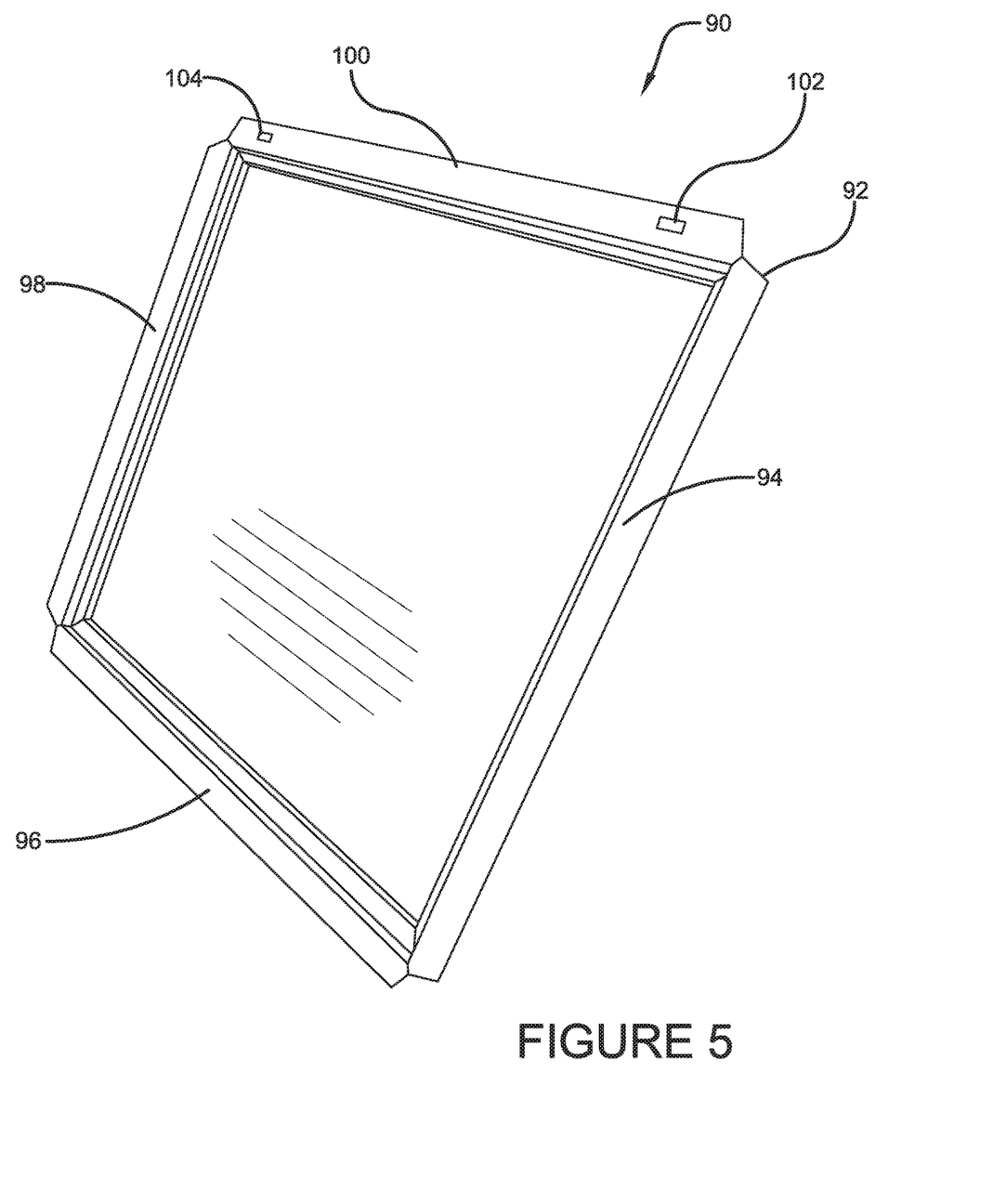
FIG. 5 is an elevated view of an alternative embodiment of a receiving basin having an outward extending lip with two receiving slots.

With reference now to FIG. 5, an alternative embodiment of a basin is shown, basin 90. Basin 90 is of similar overall construction as that of the previously discussed basins, such as basin 14, receiving basin 30, and insertion basin 50, in that it is generally comprised of a series of four sidewalls surrounding a base, however basin 90 further comprises an outward extending lip 92 about each of the four sidewalls. The four sidewalls create an enclosure around the base of basin 90. The outward extending lip 92 is elevated above that of each of the respective sidewalls of the basin 90. The outward extending lip 92, as it extends from each of the respective four sidewalls, may be better understood by reference to four separate outward extending lips, one for each respective sidewall: first extending lip 94, second extending lip 96, third extending lip 98, and fourth extending lip 100.

With continued reference to FIG. 5, the first extending lip 94 is shown having two receiving slots, 102, 104. While the receiving slots shown in FIG. 5 are of a generally rectangular design, the receiving slots 102, 104 may be of any geometric configuration that allows for the slots to receive a corresponding component for securing a second basin to that of the basin 90. The basin 90 shown in FIG. 5 has two receiving slots, a first receiving slot 102 and a second receiving slot 104, positioned about opposing distal ends of the first extending lip 94. However, additional embodiments are possible. For example, there may be only a single receiving slot placed about the middle of the extending lip 94, or three equally spaced-apart receiving slots may be used.

Figure 6:
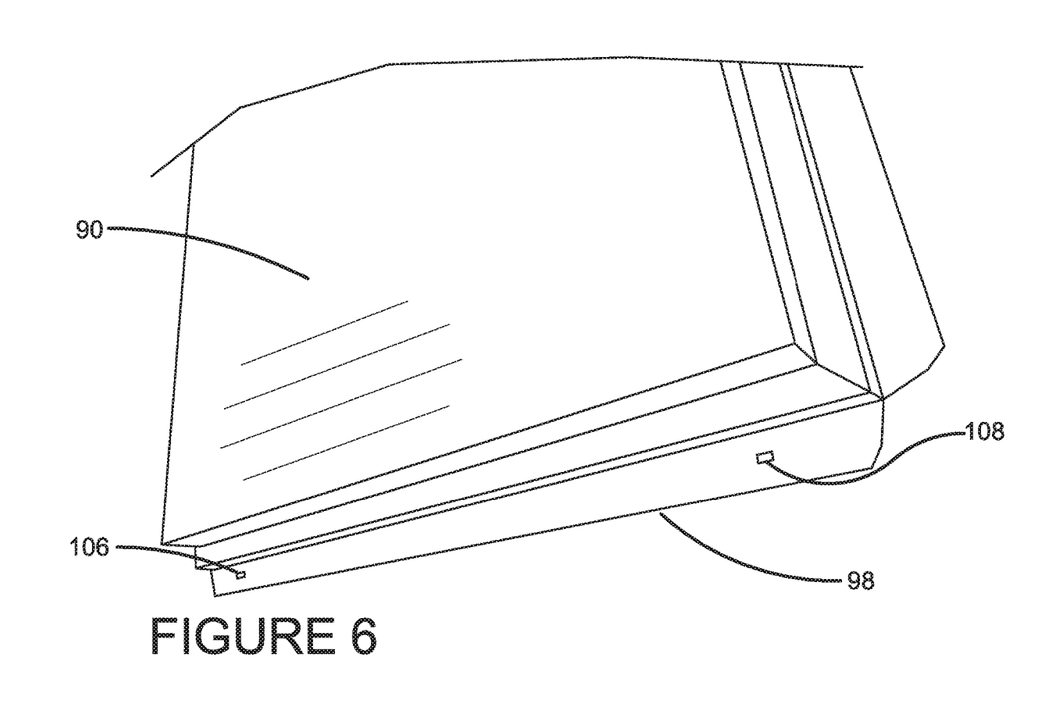
FIG. 6 is an underside view of an embodiment of a receiving basin having an outward extending lip with two insertion pins located on the underside of the lip.

With reference now to FIG. 6, the underside of basin 90 is shown, wherein two pins, first pin 106 and second pin 108, are shown about the underside of the third extending lip 98. Pins 106, 108 are capable of being inserted into the corresponding receiving slots 102, 104 on a basin unit similarly constructed to that of basin 90. This configuration of receiving slots and pins allows for two similarly constructed basin units to be joined together to create a single, larger unit. Additional embodiments may place receiving slots similar to those of receiving slots 102, 104 on either of the second extending lip 94 or fourth extending lip 100, with pins similar to that of pins 106, 108 on the opposing extending lip.

Figure 7:
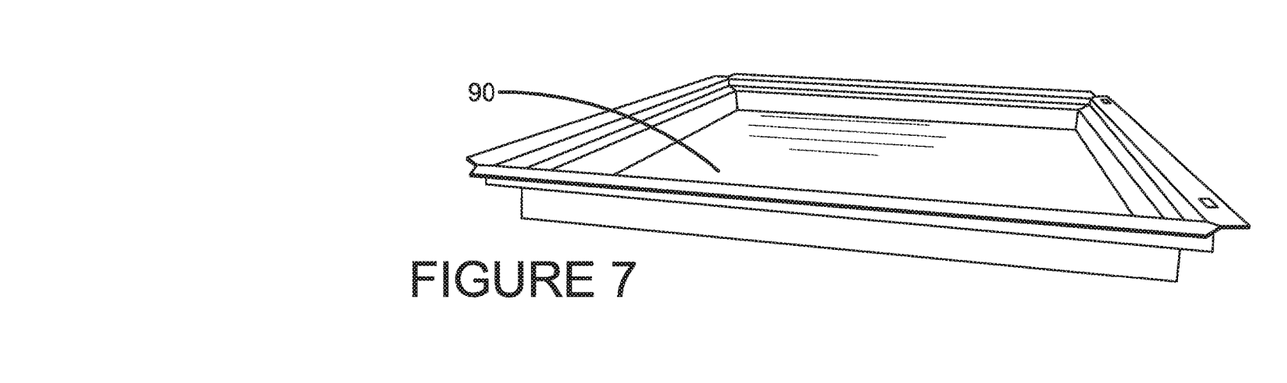
FIG. 7 is a side view of an embodiment of a receiving basin having an outward extending lip with two receiving slots.

With reference now to FIG. 7, the basin 90 is shown from the side, providing a better illustration of the differences in elevation between the base, sidewalls, and extending lips.

Figure 8:
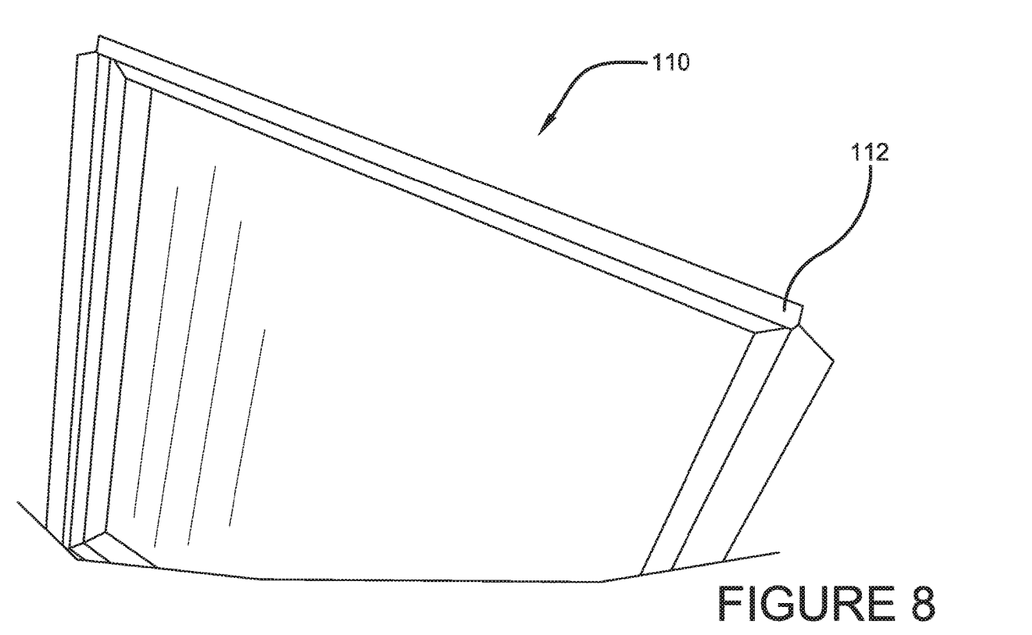
FIG. 8 is an elevated view of an alternative embodiment of a receiving basin having an outward extending lip with a sliding engagement mechanism.
Figure 9:
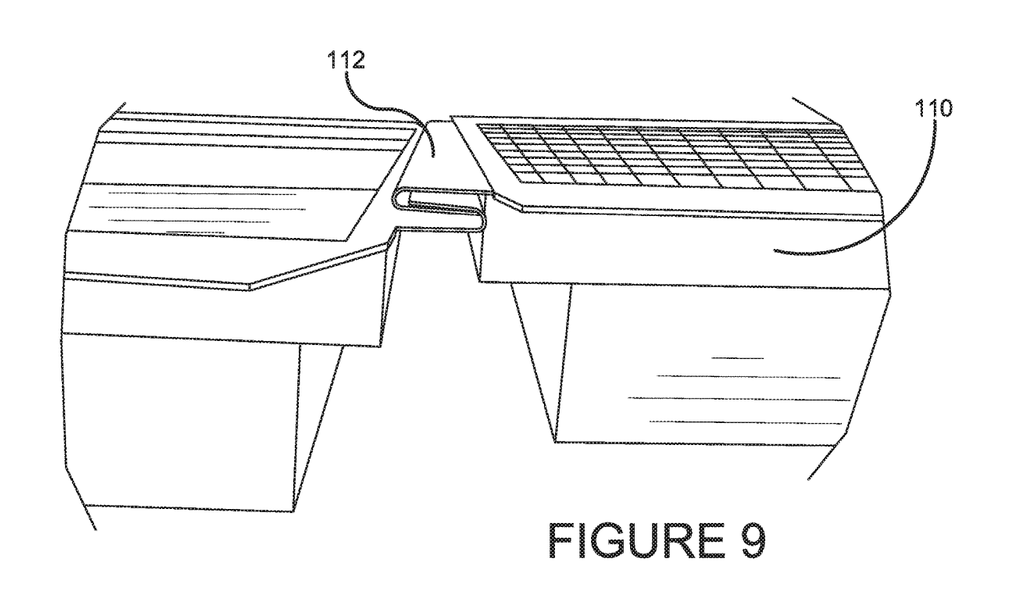
FIG. 9 is a close-up view of the sliding mechanism means of securement between two basins.

Turning now to FIG. 8, an alternative means of connecting various basin assemblies together is shown. Basin 110 has outward extending lips similar to those of basin 90, however there is an absence of any receiving slots or pins associated with basin 110. Rather, at least one of the outward extending lips of basin 110 has a sliding mechanism 112 located about the outermost edge. The sliding mechanism 112 utilizes a series of overlaid edges crimped or folded about one another so as to create a crevice wherein a corresponding sliding mechanism of a similarly constructed basin may be inserted. Referring now to FIG. 9, two basins are shown being joined together by their respective sliding mechanism. According to the embodiment of FIG. 9, the sliding mechanism 112 of basin 110 may be referred to as the male sliding mechanism, wherein the basin to which it is joined has a corresponding female sliding mechanism.

Figure 10:
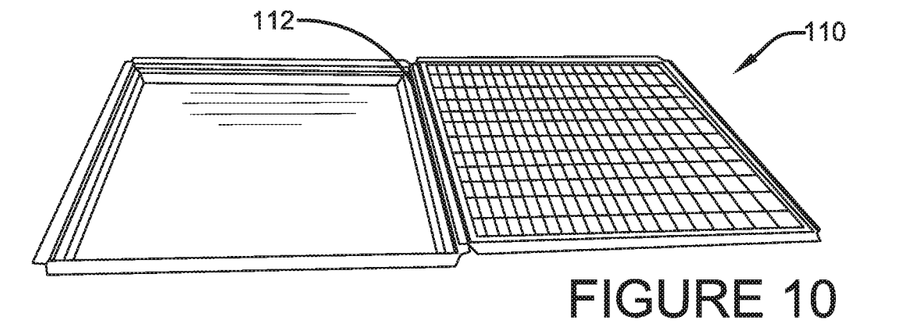
FIG. 10 shows two separate receiving basins affixed to one another to create a single, larger receiving basin unit.

With reference now to FIG. 10, two basins are shown joined together to create a single, larger basin unit. The sliding engagement mechanisms illustrated in FIGS. 8 and 9 is used in order to join the respective basins together.

Figure 11:
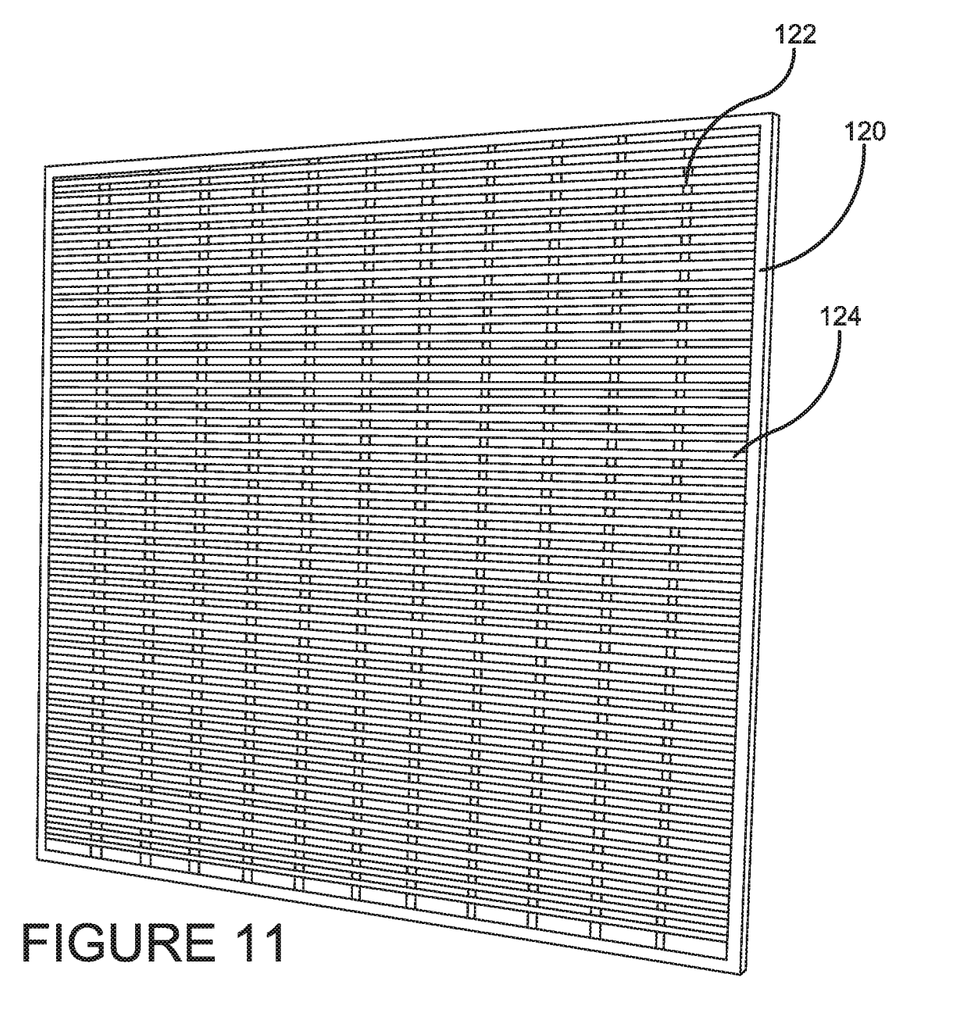
FIG. 11 is a top-down view of a grate.

Referring now to FIG. 11, a grate 120 is shown. The grate 120 may be inserted into a corresponding basin to create a basin-grate assembly. Grate 120 is comprised of a series of longitudinal bars 122 and latitudinal bars 124 that intersect with one another to create a grid-like or lattice structure. The grate 120 is approximately the same dimensions as that of the corresponding basin so as to allow for insertion directly onto the basin. Where the corresponding basin is either of basin 90 or basin 110, the grate 120 is able to rest directly on the surface located just below that of the various outward extending lips. The grate may be constructed from stainless steel, similar to that of the various basins discussed here. Either, or both, of these units may be subjected to heat treatment so as to coat the surface in a more resilient, protective coating. Such a protective coating may provide increased resistance to scratching or other damage during use. According to one example, the stainless steel units are subjected to heat treatment at approximately 350° F.

With continued reference to FIG. 11, the spacing between the various longitudinal and latitudinal bars of the grate 120 may vary. According to one embodiment, the spacing is approximately ½ inch in either direction. Various overall dimensions may also be utilized for the grate 120. For example, a grate may measure approximately 18×18 inches, 24×24 inches, or any other dimensions as identified by those having skill in the art. In the event that a basin-grate assembly is needed for a larger breed of dog, multiple basins can be connected together to create a larger basin unit having a greater overall effective surface area for the animal. According to the embodiment where the grate 120 measures 18×18 inches, connecting two basins together, and placing a corresponding grate on top of each respective basin, results in a single basin unit having overall dimensions of approximately 18×36 inches.

Figure 12:
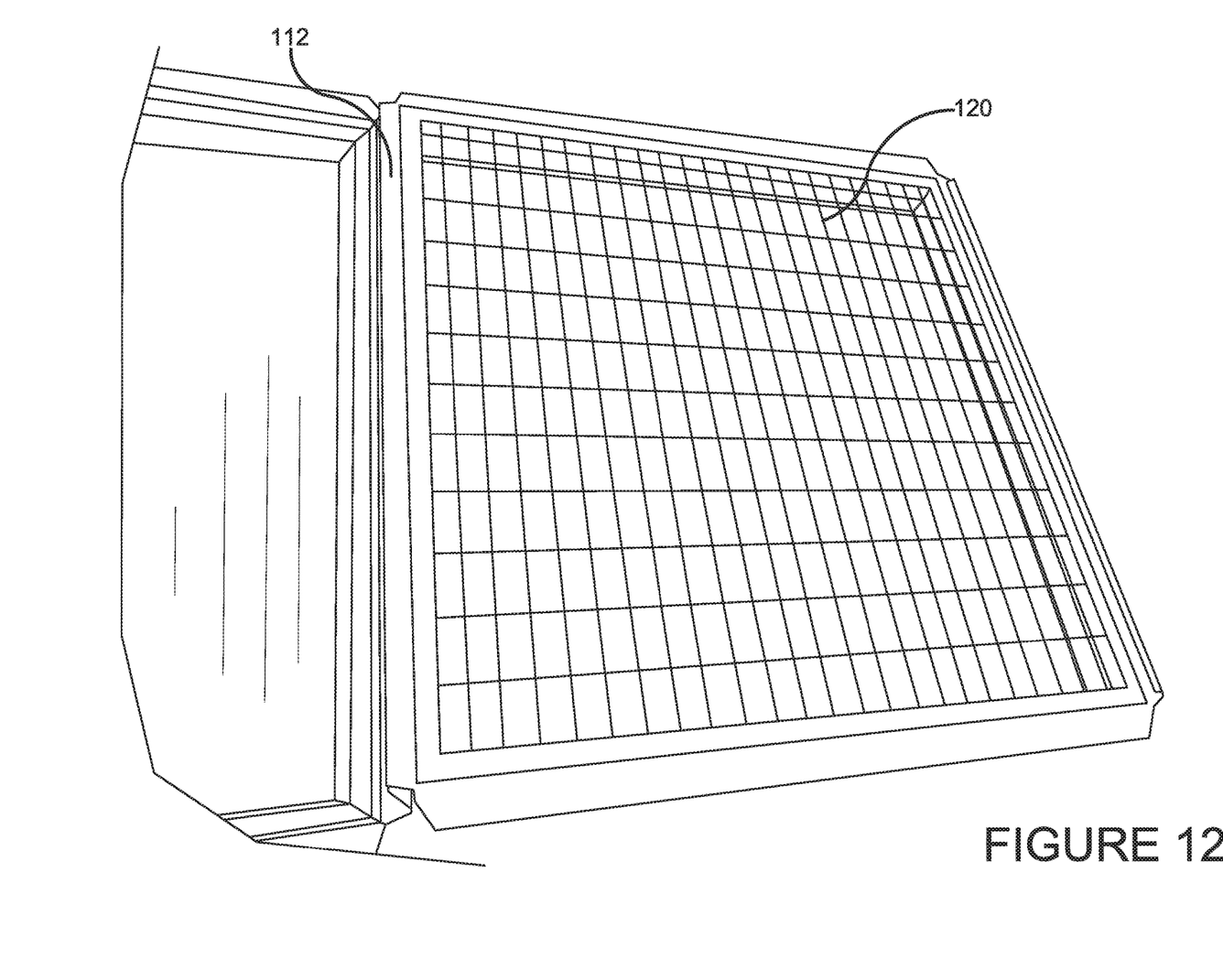
FIG. 12 is an elevated view of a basin-grate assembly with the grate inserted into a first basin, with a second basin affixed to the exterior of the first basin.
Figure 13:
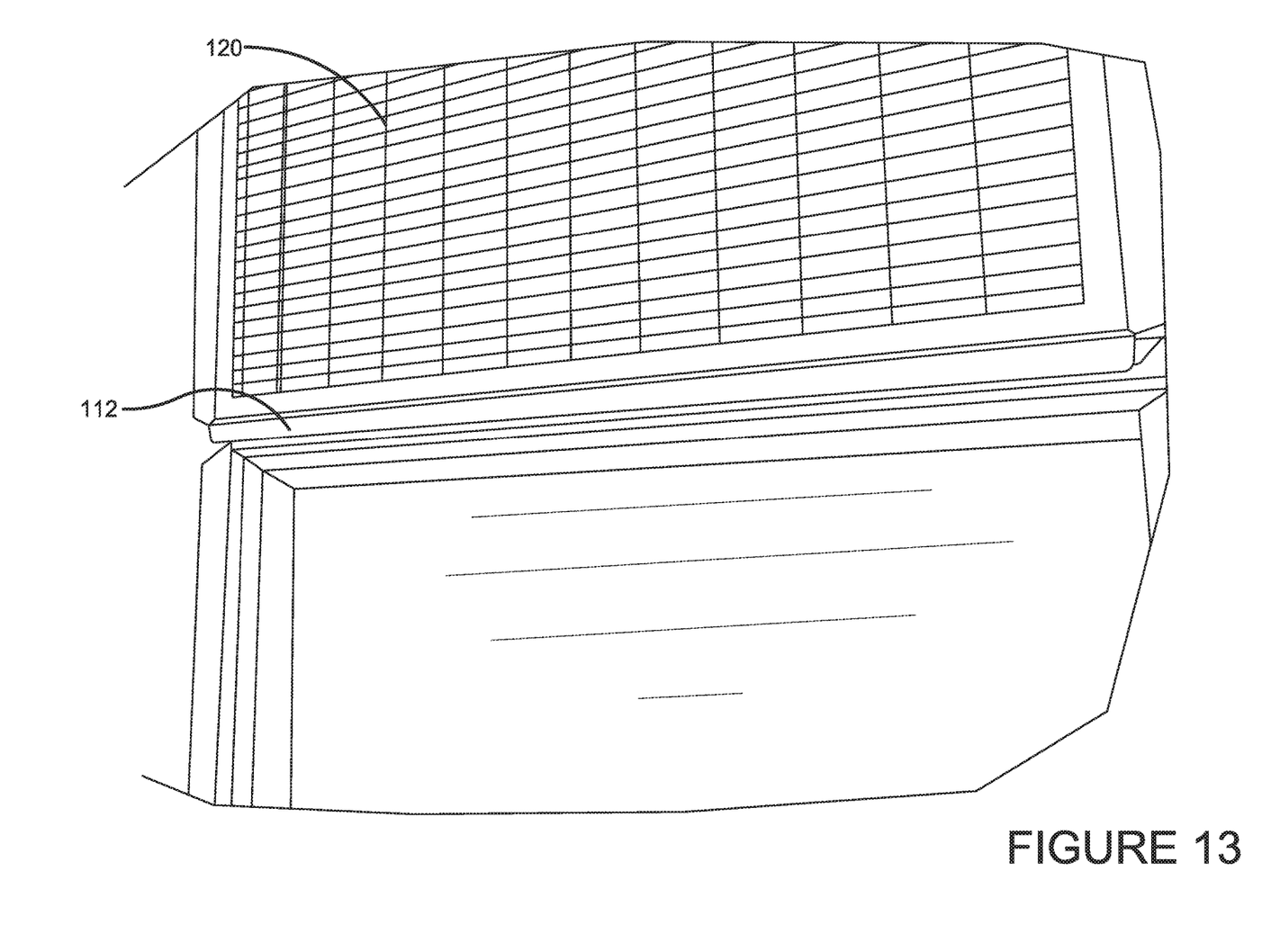
FIG. 13 is a top-down view of the basin-grate assembly depicted in FIG. 12; and, FIG. 14 is a top-down view of a basin having an absorption pad placed centrally.

Referring now to FIG. 12, a basin unit consisting of two separate basins is shown, with one of the basins having a grate 120 inserted therein. The basins shown in FIG. 12 are joined together by way of the sliding engagement mechanism 112 described above with reference to FIGS. 8 and 9, though any of the other various securement means discussed throughout the present disclosure, as well as others identified by those having skill in the art, may be utilized. FIG. 13 shows an alternative elevated view of the basin unit depicted in FIG. 12.

Figure 14:
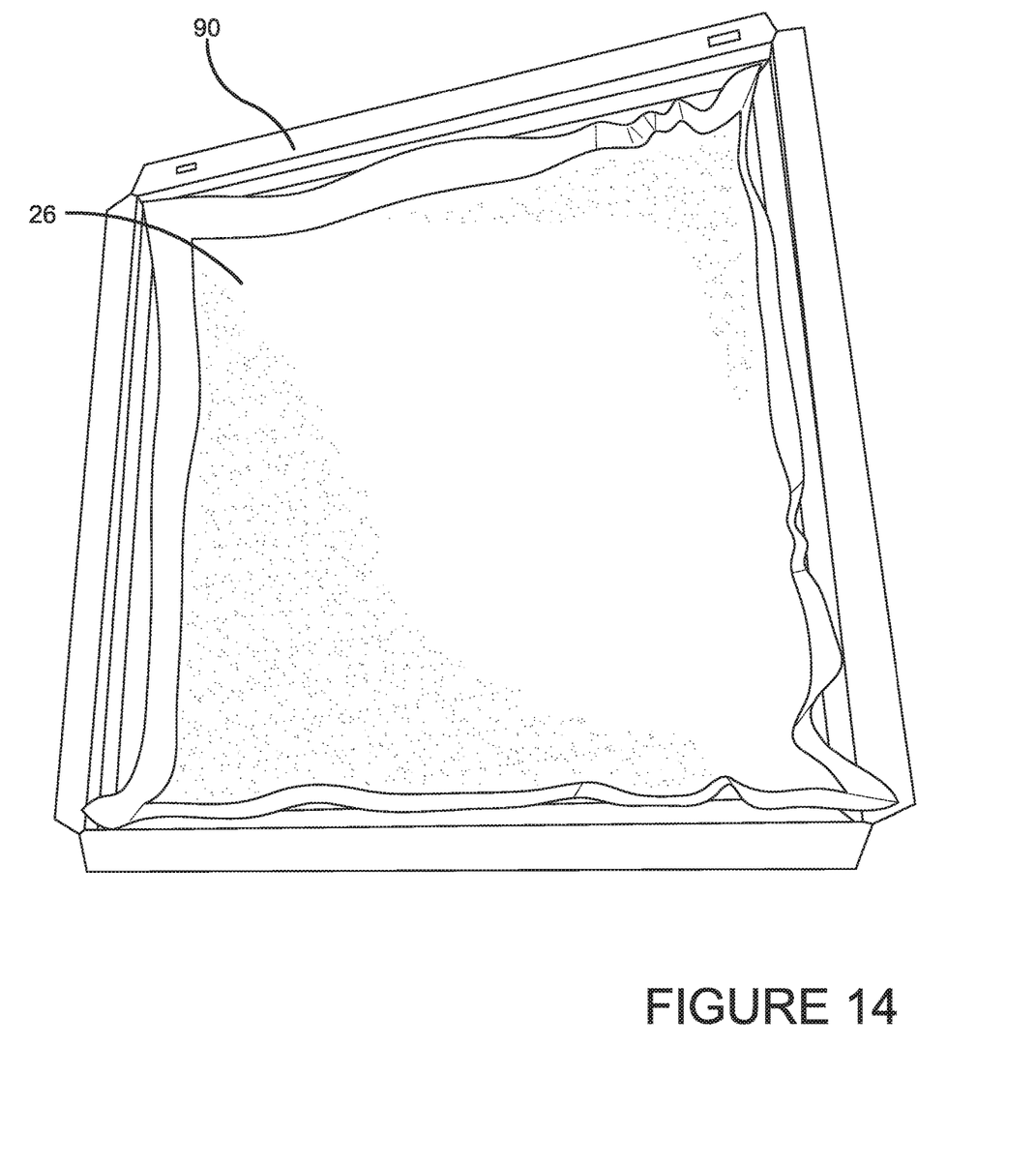

Turning now to FIG. 14, basin 90 is shown with an absorption pad 126 placed centrally. The absorption pad 126 may be a conventional pad used in the dog care industry, commonly referred to as a "puppy pad" or "doggie pad." However, alternative embodiments may utilize any type of absorption pad, material, or other substance that is capable of absorbing or partially absorbing the liquid waste from an animal. The absorption pad 126 shown in FIG. 14 is inserted directly into the basin 90. The absorption pad 126 may be slightly smaller than the basin 90, approximately the same size as the basin 90, or slightly larger than the basin 90; regardless of the exact dimensions, the absorption pad is placed directly into the center of the basin 90. Once the absorption pad has been placed, a corresponding grate, such as grate 120, may be placed over top of the absorption pad 120, thereby securing the pad in place within the basin 90. As solid waste will be trapped on the surface of the grate 120, liquid waste will pass through, wherein it is deposited on the absorption pad 126, providing for increased cleanliness and efficiency of the basin-grate assembly.

As described above, the present disclosure has been described in association with various aspects thereof and it is understood that many changes and modifications to the described aspects can be carried out without departing from the scope and the spirit of the present disclosure that is intended to be limited only by the appended claims.

What is claimed is:

1. A waste collection apparatus, comprising:
   a basin comprising:
      a base;
      a first sidewall;
      a second sidewall;
      a third sidewall; and,
      a fourth sidewall, wherein said first, second, third, and fourth sidewalls extend upward and away from said base to create an enclosure around said base; and,
   a grate having four edges and internally spaced apart bars extending in both the longitudinal and latitudinal direction;
   wherein each of said sidewalls has a lip extending outward and away from the enclosure around said base, one of said lips has at least one receiving slot, one of said lips has at least one pin, and the grate is placed above the enclosure around said base and supported by said sidewalls.

2. The waste collection apparatus of claim 1, wherein each of said basin and grate are constructed from stainless steel.

3. The waste collection apparatus of claim 2, wherein each of said basin and grate are covered in a protective, heat-treated coating.

4. The waste collection apparatus of claim 1, wherein the enclosure around the base measures 18 inches by 18 inches, and the grate measures 18 inches by 18 inches.

5. The waste collection apparatus of claim 4, wherein the space between the longitudinal and latitudinal bars is ½ inch.

6. The waste collection apparatus of claim 1, further comprising an absorption pad placed in the enclosure created around said base.

7. A waste collection apparatus, comprising:
a first basin comprising:
a base;
a first sidewall;
a second sidewall;
a third sidewall; and,
a fourth sidewall, wherein said first, second, third, and fourth sidewalls of said first basin extend upward and away from said base to create an enclosure around said base, each of said sidewalls has a lip extending outward and away from the enclosure around said base, one of said lips has at least one receiving slot, and one of said lips has at least one pin;
a first grate having four edges and internally spaced apart bars extending in both the longitudinal and latitudinal direction, wherein said first grate is placed above the enclosure around said base of the first basin and supported by said sidewalls;
a second basin comprising:
a base;
a first sidewall;
a second sidewall;
a third sidewall; and,
a fourth sidewall, wherein said first, second, third, and fourth sidewalls of said second basin extend upward and away from said base to create an enclosure around said base, each of said sidewalls has a lip extending outward and away from the enclosure around said base, one of said lips has at least one receiving slot, and one of said lips has at least one pin; and,
a second grate having four edges and internally spaced apart bars extending in both the longitudinal and latitudinal direction, wherein said second grate is placed above the enclosure around said base of the second basin and supported by said sidewalls;
wherein said first basin and said second basin are affixed to one another.

8. The waste collection apparatus of claim 7, wherein at least one pin of said first basin is inserted into a receiving slot of said second basin.

9. The waste collection apparatus of claim 7, wherein at least one pin of said second basin is inserted into a receiving slot of said first basin.

10. The waste collection apparatus of claim 7, wherein one of said lips of said first basin has two receiving slots and one of said lips has two pins, and one of said lips of said second basin has two receiving slots and one of said lips has two pins.

11. The waste collection apparatus of claim 10, wherein the two receiving slots of said first basin receive the two pins of said second basin.

12. The waste collection apparatus of claim 10, wherein the two receiving slots of said second basin receive the two pins of said first basin.

13. The waste collection apparatus of claim 7, wherein one of said lips of said first basin has two receiving slots, the opposing lip has two receiving slots, and the remaining two lips each have two pins, and one of said lips of said second basin has two receiving slots, the opposing lip has two receiving slots, and the remaining two lips each have two pins.

14. The waste collection apparatus of claim 13, further comprising:
a third basin comprising:
a base;
a first sidewall;
a second sidewall;
a third sidewall; and,
a fourth sidewall, wherein said first, second, third, and fourth sidewalls of said third basin extend upward and away from said base to create an enclosure around said base, each of said sidewalls has a lip extending outward and away from the enclosure around said base, one of said lips has at least one receiving slot, and one of said lips has at least one pin; and,
a third grate having four edges and internally spaced apart bars extending in both the longitudinal and latitudinal direction, wherein said third grate is placed above the enclosure around said base of the third basin and supported by said sidewalls;
wherein said third basin is affixed to either of said first or second basin.

15. The waste collection apparatus of claim 14, further comprising:
a first absorption pad placed in the enclosure created around said base of said first basin;
a second absorption pad placed in the enclosure created around said base of said second basin; and,
a third absorption pad placed in the enclosure created around said base of said third basin.

16. A method of assembling and disassembling a waste collection apparatus, comprising the steps of:
affixing a first basin to a second basin, said first and second basin each comprising:
a base;
a first sidewall;
a second sidewall;
a third sidewall; and,
a fourth sidewall, wherein said first, second, third, and fourth sidewalls extend upward and away from said base to create an enclosure around said base, each of said sidewalls has a lip extending outward and away from the enclosure around said base, one of said lips has at least one receiving slot, and one of said lips has at least one pin;
wherein at least one pin from the first basin is inserted into one of the receiving slots of the second basin;
placing an absorption pad in the enclosure created around said base of each of the first and second basins; and,
positioning a grate above the enclosure around said base of each of the first and second basins, each of the grates having four edges and internally spaced apart bars extending in both the longitudinal and latitudinal direction.

17. The method of claim 16, further comprising the steps of:
removing a grate from a corresponding basin following the deposit of waste on the surface of the grate;
cleaning the grate; and,
repositioning the grate above the enclosure around said base.

18. The method of claim 16, further comprising the steps of:
removing a grate from a corresponding basin following deposit of waste on the absorption pad;
removing the absorption pad from the basin;
cleaning the basin;
placing a new absorption pad in the enclosure created around said base; and,
repositioning the grate above the enclosure around said base.

19. The method of claim 16, further comprising the steps of:
- removing a grate from a corresponding basin following the deposit of waste on either the surface of the grate or the absorption pad;
- cleaning the grate;
- removing the absorption pad from the basin;
- cleaning the basin;
- placing a new absorption pad in the enclosure created around said base; and,
- repositioning the grate above the enclosure around said base.

20. The method of claim 19, further comprising the step of placing the waste collection apparatus inside an animal housing unit.

* * * * *